United States Patent
Ben-Sa'adon et al.

(10) Patent No.: US 9,960,822 B2
(45) Date of Patent: May 1, 2018

(54) METHOD AND SYSTEM FOR FACILITATING COORDINATED MULTIPOINT COMMUNICATION FOR A CLIENT DEVICE IN A WIRELESS COMMUNICATION NETWORK

(71) Applicant: ADVA Optical Networking SE, Meiningen (DE)

(72) Inventors: Eyal Ben-Sa'adon, Karkur (IL); Andrew Sergeev, Kfar Saba (IL)

(73) Assignee: Adva Optical Networking SE, Meiningen (DE)

(*) Notice: Subject to any disclaimer, the term of this patent is extended or adjusted under 35 U.S.C. 154(b) by 101 days.

(21) Appl. No.: 15/041,666

(22) Filed: Feb. 11, 2016

(65) Prior Publication Data

US 2016/0241309 A1    Aug. 18, 2016

(30) Foreign Application Priority Data

Feb. 13, 2015    (EP) ..................................... 15000478

(51) Int. Cl.
| | |
|---|---|
| H04L 12/28 | (2006.01) |
| H04B 7/024 | (2017.01) |
| H04W 16/18 | (2009.01) |
| H04W 56/00 | (2009.01) |
| H04W 28/16 | (2009.01) |

(52) U.S. Cl.
CPC ............ H04B 7/024 (2013.01); H04W 16/18 (2013.01); H04W 28/16 (2013.01); H04W 56/002 (2013.01)

(58) Field of Classification Search
CPC ... H04L 5/0035; H04B 7/024; H04B 7/15592; H04J 11/0053
See application file for complete search history.

(56) References Cited

U.S. PATENT DOCUMENTS

| | | |
|---|---|---|
| 7,835,272 B1 | 11/2010 | Johnson et al. |
| 2013/0294288 A1 | 11/2013 | Choi et al. |
| 2013/0337818 A1 | 12/2013 | Biermann et al. |

FOREIGN PATENT DOCUMENTS

| | | |
|---|---|---|
| EP | 2490378 A1 | 8/2012 |
| EP | 2498530 A1 | 9/2012 |
| WO | 2014121846 A1 | 8/2014 |

*Primary Examiner* — Alvin Zhu
(74) *Attorney, Agent, or Firm* — The Webb Law Firm

(57) ABSTRACT

A method for facilitating coordinated multipoint communication providing a plurality of network interface devices for measuring synchronization accuracy in the backhaul network; creating an actual coverage map for the coordinated multipoint communication analyzing the created actual coverage map to determine whether the backhaul network is sufficient for a selected coordinated multipoint technique; if the backhaul network is not sufficient determining one or more key performance indicators creating a conditional coverage map; comparing the actual coverage map with the conditional coverage map; reconfiguring the wireless communication network if the actual coverage map does not match the conditional coverage map.

20 Claims, 4 Drawing Sheets

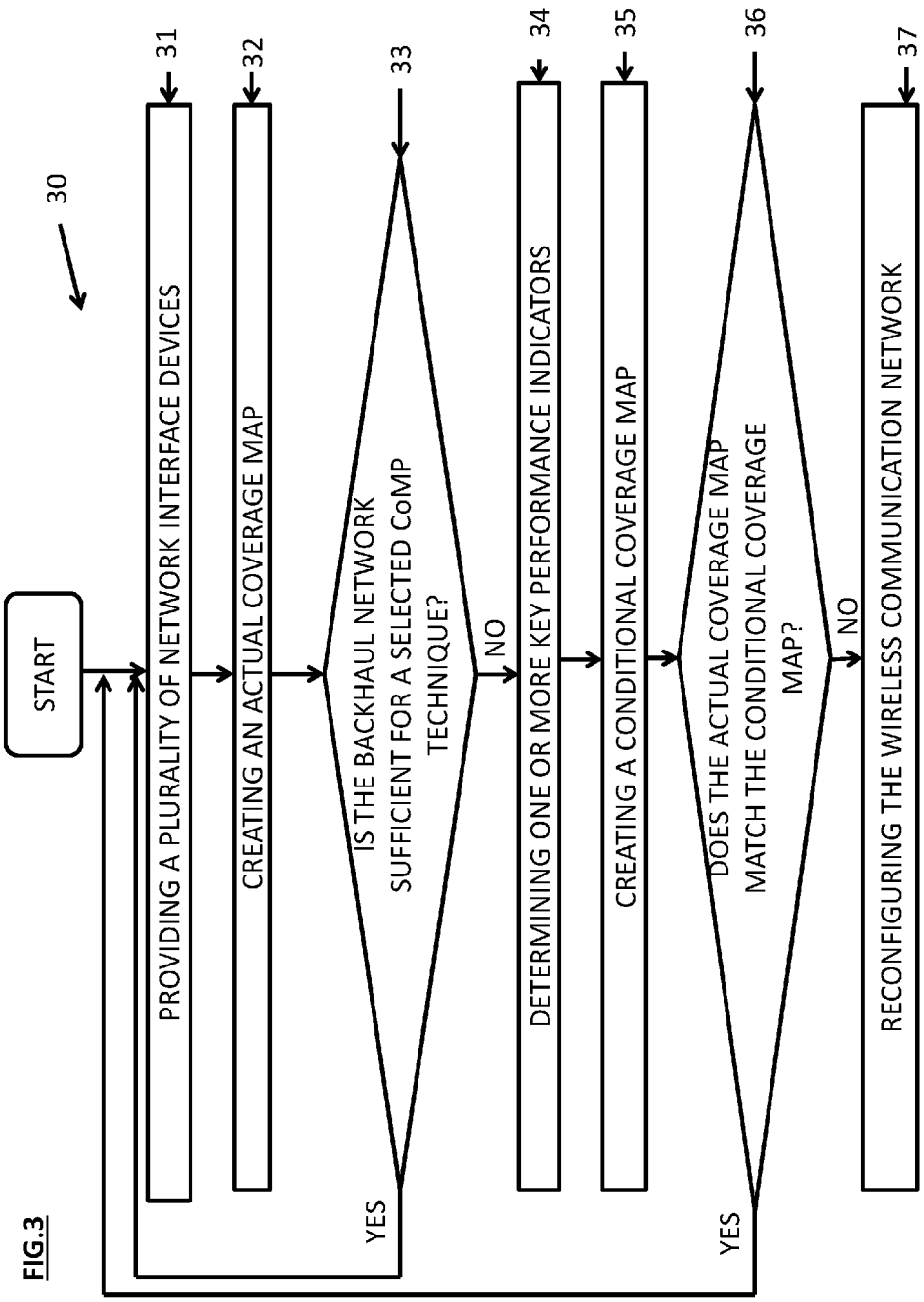

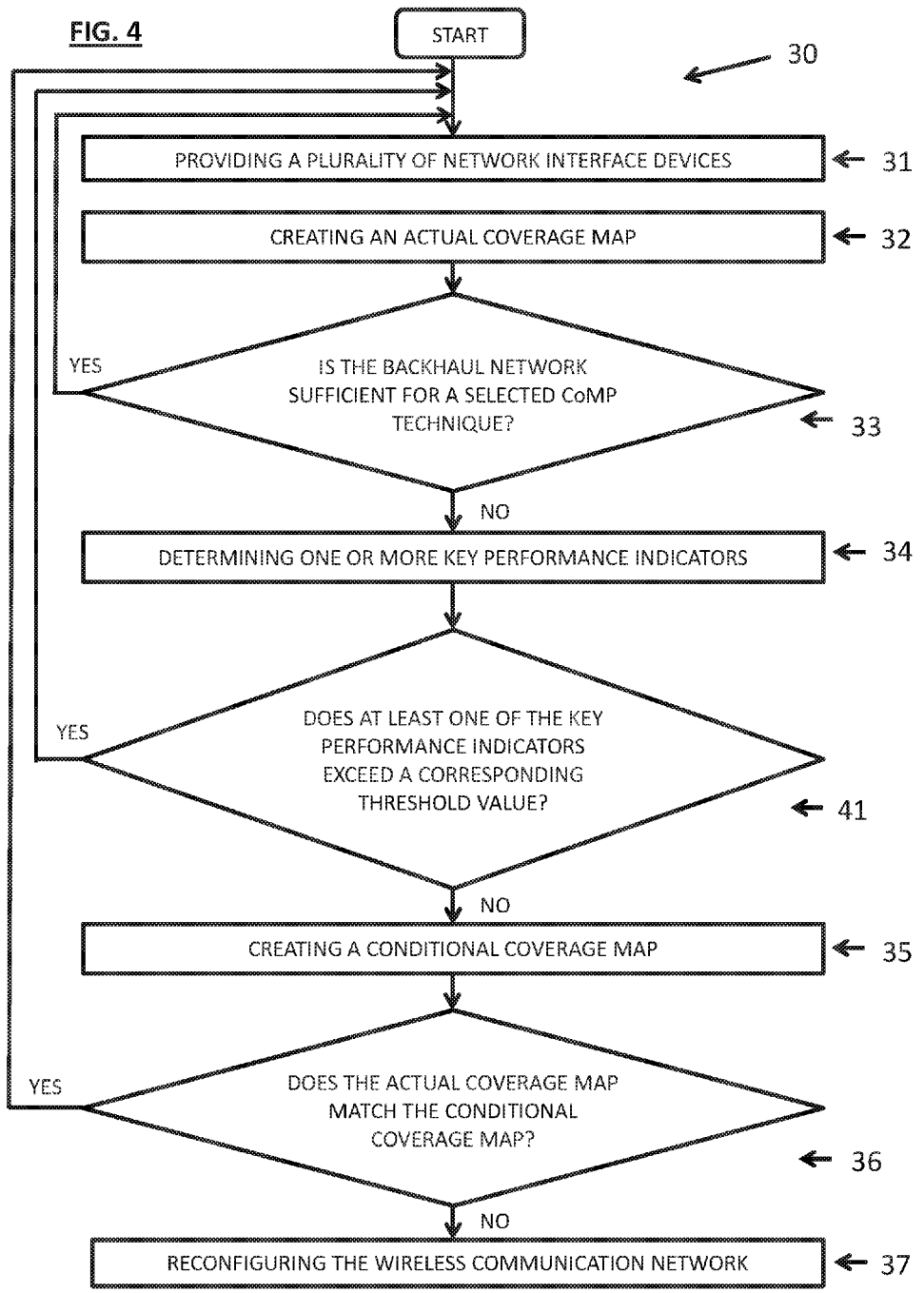

METHOD AND SYSTEM FOR FACILITATING COORDINATED MULTIPOINT COMMUNICATION FOR A CLIENT DEVICE IN A WIRELESS COMMUNICATION NETWORK

CROSS-REFERENCE TO RELATED APPLICATION

This application claims priority to European Patent Application No. 15000478.6 filed Feb. 13, 2015, the disclosure of which is hereby incorporated in its entirety by reference.

BACKGROUND OF THE INVENTION

Field of the Invention

The present invention relates to a method and a system for facilitating coordinated multipoint communication in a wireless network, in particular to a method and a system for improving the coordination of multi-point communication in a wireless communication network comprising a plurality of base stations and a backhaul network connecting the plurality of base stations.

Description of Related Art

Coordinated multi-point (CoMP) techniques provide an increased user throughput in Long Term Evolution (LTE)-Advanced. Therein, several base stations jointly serve one or more user elements or client devices, which, therefore, allows for a more efficient management of inter-cell interferences and higher multiplexing gain of Multiple Input Multiple Output (MIMO) systems by increasing a virtual number of antennas.

Therein, to maximize the performance gain of CoMP it is necessary to find and select cooperating base stations which are capable of joining a selected CoMP technique in the radio layer. This may for example be done by detecting base stations within the range of a client device so that the radio parameters, such as the reference signal received quality and channel state information are commonly used. Further, when considering a CoMP technique, it is also necessary to consider the backhaul network properties, such as available capacity and latency for the clustering procedure, because the CoMP technique needs to share information and/or user data with other base stations through the backhaul network.

EP 2 498 530 A1 discloses a method for coordinated multipoint communication in a wireless communication network. The wireless communication network has a plurality of base stations and a backhaul network connecting the plurality of base stations. Therein, the method includes selecting one or more cooperating base stations for a coordinated multipoint communication for a client device serviced by a serving base station, determining whether the backhaul network supports a coordinated multipoint technique selected for a cooperating base station, and in case the backhaul network is not sufficient to support a coordinated multipoint technique for one or more of the cooperating base stations, reconfiguring the backhaul network to meet the requirements of the coordinated multipoint technique.

However, a poor and, therefore, insufficient performance might also be caused by the backhaul network itself. In this case, reconfiguring the wireless communication network, which is for example a Radio Access Network (RAN), might be useless or even have the adverse effect on LTE-Advanced performance.

It is an object of the present invention to provide an improved method for facilitating coordinated multipoint communication for a client device in a wireless communication network.

SUMMARY OF THE INVENTION

The present invention provides a method for facilitating coordinated multipoint communication for a client device in a wireless communication network comprising a plurality of base stations and a backhaul network connecting the plurality of base stations. Here, a plurality of network interface devices for measuring synchronization accuracy in the backhaul network are provided, wherein each of the plurality of network devices is assigned to one of the plurality of base stations and arranged in close proximity to the respective base station. Further, an actual coverage map for the coordinated multipoint communication is created by analyzing data transfer between the client device and the plurality of base stations. The created actual coverage map is analyzed to determine, whether the backhaul network is sufficient for a selected coordinated multipoint technique. If the backhaul network is not sufficient for the selected coordinated multipoint technique, one or more key performance indicators indicating the performance of the backhaul network are determined by means of the plurality of network interface devices, a conditional coverage map is created on the basis of the determined one or more key performance indicators and the actual coverage map is compared with the conditional coverage map to determine whether the actual coverage map matches the conditional coverage map. Further, the wireless communication network is reconfigured if the actual coverage map does not match the conditional coverage map.

Thus, an improved method for facilitating coordinated multipoint communication for a client device in a wireless communication network is provided. In particular, since a conditional coverage map is created on the basis of determined key performance indicators, which is compared to an actual coverage map for the coordinated multipoint technique when the network realizes difficulties to fulfill CoMP requirements, wherein the wireless communication network is reconfigured if the actual coverage map does not match the conditional coverage map, false reconfiguration actions by reconfiguring the wireless communication network if poor and insufficient performance of the CoMP communication is caused by the backhaul network itself, can be avoided. Therefore, the efficiency of the selected CoMP technique can be improved, thereby improving LTE-Advanced network manageability and troubleshooting.

Here, each of the network interface devices being arranged in close proximity of the respective base station denotes that the network interface device is arranged in the proximity of the base station in such a way, that it can cover data throughput through the respective base station, for example using pass through mode technique.

In some embodiments, the step of determining one or more key performance indicators of the backhaul network by means of the plurality of network interface devices can comprise measuring data transfer delay on the backhaul network and/or estimating phase accuracy of data transfer on the backhaul network. Since conclusions over latency of the backhaul network can be drawn from determining data transfer delay and conclusion over the effective bandwith of data transmitted to the client device can be drawn from performing phase accuracy estimation of data transfer on the backhaul network, transmission characteristics of data transmission over the backhaul network can be determined by measuring data transfer delay and/or estimating phase accuracy of data transfer on the backhaul network, thereby giving feedback on the overall backhaul network performance. However, that the one or more key performance indicators comprise data transfer delay and phase accuracy estimation should merely be understood as an example, and further key performance indicators giving feedback on the overall backhaul network performance can be determined, too.

The method can further comprise the steps of comparing each of the determined one or more key performance indicators to corresponding threshold values for the one or more key performance indicators and creating the conditional coverage map if at least one of the one or more key performance indicators exceeds a corresponding threshold value. In network management, and, therefore, in backhaul network management, every key performance indicator can be matched to threshold values to determine the severity levels of a network activity. The Service Level Agreement (SLA) goals are directly mapped to these thresholds. When the threshold is reached, and the SLA is violated, appropriate action needs to be taken. Thus, it can be ensured that the conditional coverage map is created and compared to the actual coverage map for the coordinated multipoint communication only if a SLA is violated and, therefore, if appropriate actions need to be taken, thereby further eliminating false corrective actions.

Further, the selected coordinated multipoint technique can comprise joint processing, coordinated scheduling and/or coordinated beamforming. Joint processing arises when there is a coordination between multiple entities, in particular multiple base stations that are simultaneously transmitting or receiving to or from one or more client devices. Coordinated scheduling and/or coordinated beamforming is a form of coordination wherein a client device is transmitting with a single transmission or reception point, in particular a serving base station. Here, the communication is made with an exchange of control among several coordinated entities, in particular several cooperating base stations. Here, to achieve either of these modes, a highly detailed feedback is required on the channel properties in a fast manner. Further, very close coordination between the base stations is required to facilitate the combination of data or fast switching of the cells. The techniques used for CoMP are very different for uplink and downlink. This results from the fact that several base stations are in a network, connected to other base stations, whereas the client devices are individual elements.

The step of reconfiguring the wireless communication network if the actual coverage map does not match the conditional coverage map can comprise reconfiguring or activating network components according to performance requirements of the selected coordinated multipoint technique. Therein, if the selected coordinated multipoint technique is coordinated scheduling, the activated network components can include for example an optical tunneling link between serving base stations and one or more cooperating base station. Thereby, an excessive multi-hop delay resulting in an increased latency which is not suitable for supporting the selected CoMP technique can be encountered. The optical tunneling link may also be provided in case it turns out that a network latency for transmitting data for the selected CoMP technique is not sufficient. An example of a further network component that may be activated is a wireless point-to-point backhaul link, for example a microwave link between serving base stations and cooperating base stations.

A system for facilitating coordinated multipoint communication for a client device in a wireless communication network is also provided, wherein the wireless communication network comprises a plurality of base stations and a backhaul network connecting the plurality of base stations. The system comprises a means for creating an actual coverage map for the coordinated multipoint communication by analyzing data transfer between the client device and the plurality of base stations, a means for analyzing the created actual coverage map to determine whether the backhaul network is sufficient for a selected coordinated multipoint technique and a network controller to reconfigure the wireless communication network if the backhaul network is not sufficient for the selected coordinated multipoint technique. The system further comprises a plurality of network interface devices for measuring synchronization accuracy in the backhaul network, wherein each of the plurality of network interface devices is assigned to one of the plurality of base stations and arranged in close proximity to the respective base station, wherein each of the network interface devices comprises means for determining one or more key performance indicators of the backhaul network if the means for analyzing the created actual coverage map determines that the backhaul network is not sufficient for a selected coordinated multipoint technique. There is further a means for creating a conditional coverage map on the basis of the determined one or more key performance indicators, and a means for comparing the actual coverage map with the conditional coverage map. Here, the network controller reconfigures the wireless communication network if the actual coverage map does not match the conditional coverage map.

Thus, an improved system for facilitating coordinated multipoint communication for a client device in a wireless communication network is provided. In particular, since a conditional coverage map is created on the basis of determined key performance indicators by the means for creating a conditional coverage map, which is compared to an actual coverage map for the coordinated multipoint technique by the means for comparing the actual coverage map with the conditional coverage map when the network realizes difficulties to fulfill CoMP requirements and the network controller only reconfigures the wireless communication network if it is determined by the means for comparing the actual coverage map with the conditional coverage map that the actual coverage map does not match the conditional coverage map, false reconfiguration actions of the network controller, in particular reconfiguring the wireless communication network if poor and insufficient performance of the CoMP communication is caused by the backhaul network itself, can be avoided. Therefore, the efficiency of the selected CoMP technique can be improved, thereby improving LTE-Advanced network manageability and troubleshooting. Here, each of the network interface devices being arranged in close proximity of the respective base station denotes that the network interface device is arranged in the proximity of the base station in such a way, that it can cover throughput through the base station, for example using pass through mode technique.

In some embodiments, the means for determining one or more key performance indicators of the backhaul network can comprise a means for measuring data transfer delay on the backhaul network and/or a means for estimating phase accuracy of data transfer on the backhaul network. Since conclusions over latency of the backhaul network can be drawn from the means for measuring data transfer delay on the backhaul network and conclusion over the effective bandwith of data transmitted to the client device can be drawn from means for estimating phase accuracy of data transfer on the backhaul network, transmission characteristics of data transmission over the backhaul network can be determined by these means, thereby giving feedback on the overall backhaul network performance. However, that the one or more key performance indicators comprise data transfer delay and phase accuracy estimation should merely be understood as an example, and there can be means for determining further key performance indicators giving feedback on the backhaul network performance, too.

The system can further comprise a means for comparing each of the one or more determined key performance indicators to corresponding threshold values, wherein the means for creating a conditional coverage map on the basis of the determined one or more key performance indicators creates the conditional coverage map if at least one of the one or more key performance indicators exceeds a corresponding threshold value. In network management, and, therefore, in backhaul network management, every key performance indicator can be matched to threshold values by respective means to determine the severity levels of a network activity. The Service Level Agreement (SLA) goals are directly mapped to these thresholds. When the threshold is reached, and the SLA is violated, appropriate action needs to be taken. Thus, it can be ensured that the means for creating a conditional coverage map on the basis of the determined one or more key performance indicators creates a conditional coverage map and the means for comparing the actual coverage map with the conditional coverage map compares the actual coverage map for the coordinated multipoint communication with the created conditional coverage map only if a SLA is violated and, therefore, appropriate actions needs to be taken, thereby further eliminating false corrective actions.

The selected coordinated multipoint technique can comprise joint processing, coordinated scheduling and/or coordinated beamforming. Joint processing arises when there is a coordination between multiple entities, in particular multiple base stations that are simultaneously transmitting or receiving to or from one or more client devices. Coordinated scheduling and/or coordinated beamforming is a form of coordination wherein a client device is transmit-ting with a single transmission or reception point, in particular a serving base station. Here, the communication is made with an exchange of control among several coordinated entities, in particular several cooperating base stations. To achieve either of these modes, a highly detailed feedback is required on the channel properties in a fast manner. Further, very close coordination between the base stations is required to facilitate the combination of data or fast switching of the cells. The techniques used for CoMP are very different for uplink and downlink. This results from the fact that several base stations are in a network, connected to other base stations, whereas the client devices are individual elements.

Further, the network controller can reconfigure or activate network components according to the performance requirements of the selected coordinated multipoint technique for reconfiguring the wireless communication network. If the selected CoMP technique is coordinated scheduling, the network components activated by the network controller can include for example an optical tunneling link between serving base stations and one or more cooperating base stations. Thereby, an excessive multi-hop delay resulting in an increased latency which is not suitable for supporting the selected CoMP technique can be encountered. The optical tunneling link may also be provided in case it turns out that a network latency for transmitting data for the selected CoMP technique is not sufficient. An example of a further network component that may be activated by the network controller is a wireless point-to-point backhaul link, for example a microwave link between serving base stations and cooperating base stations.

BRIEF DESCRIPTION OF THE DRAWINGS

Embodiments of the invention will now be described with reference to the drawings.

FIG. 3 illustrates a flowchart of a method for facilitating coordinated multipoint communication for a client device in a wireless communication network according to embodiments of the present invention.

FIG. 4 illustrates a flowchart of a method for facilitating coordinated multipoint communication for a client device in a wireless communication network according to further embodiments of the present invention.

Figure 1:
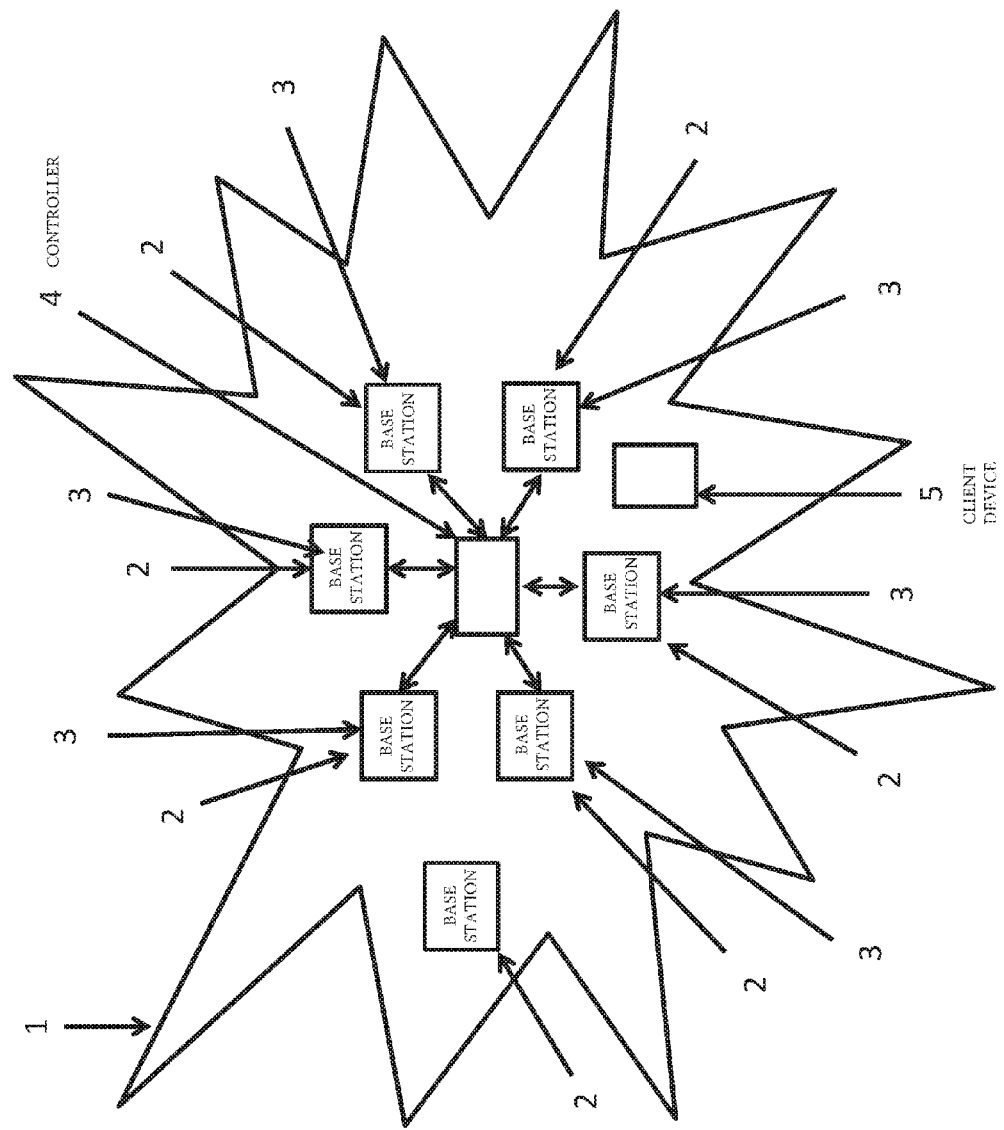
FIG. 1 illustrates a schematic representation of a wireless communication network comprising a plurality of base stations.
Figure 2:
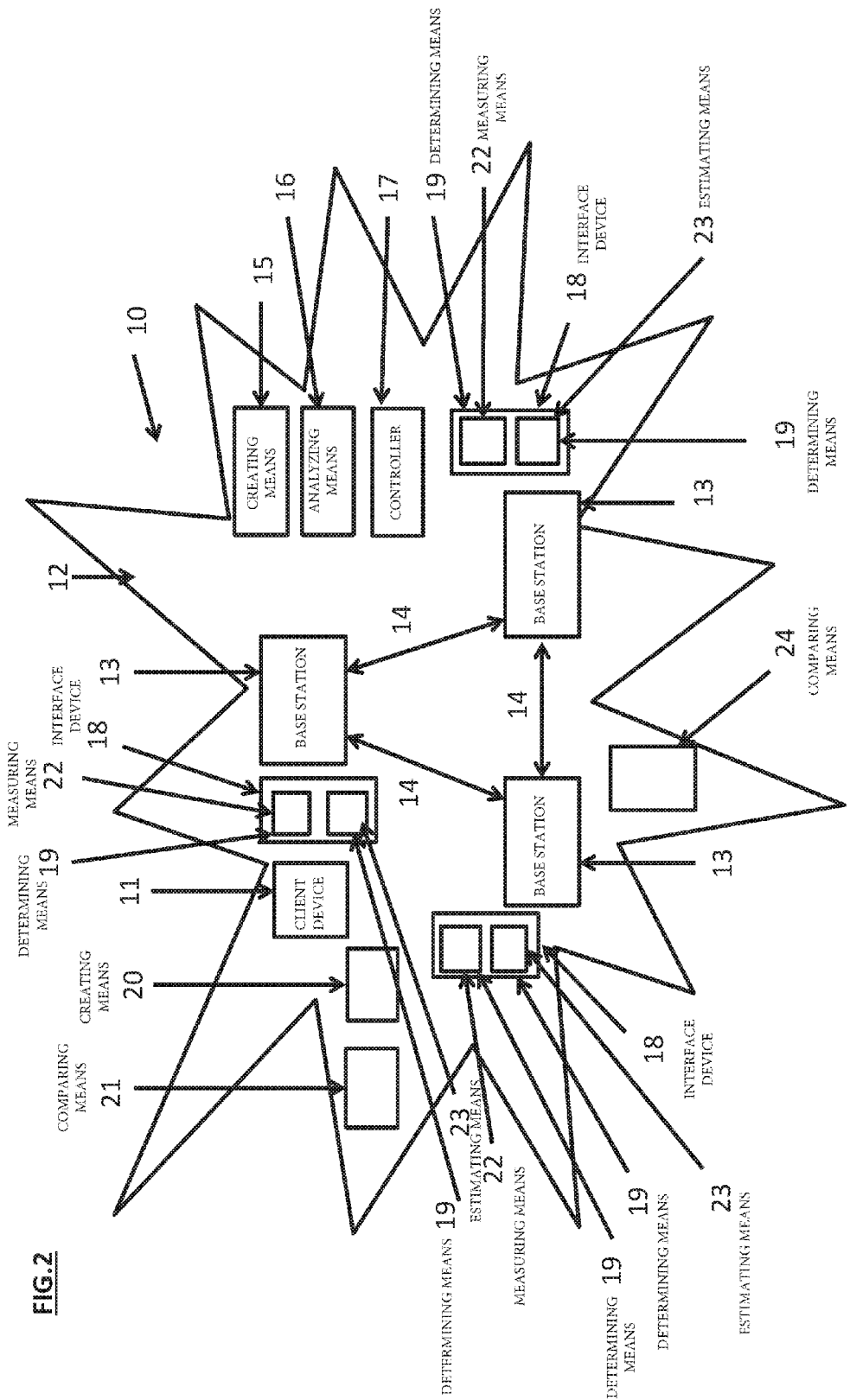
FIG. 2 illustrates a system for facilitating coordinated multipoint communication for a client device in a wireless communication network according to embodiments of the present invention.

Although the functional boxes in FIGS. 1 and 2 include descriptive labels that are shortened due to space limitations in the figures, it is to be understood that each reference number of the figures refers to elements of the invention as described in the specification.

DETAILED DESCRIPTION OF THE INVENTION

FIG. 1 illustrates a schematic representation of a wireless communication network 1 comprising a plurality of base stations 2.

The wireless communication network 1 shown comprises a set of base stations 3 and a respective base station controller 4, wherein the set of base stations 3 is coupled via a backhaul network, for example via a Wavelength Division Multiplexing Passive Optical Network (WDM-PON) to the base station controller 4. The backhaul network is schematically shown by lines connecting the base stations of the set of base stations 3 with the base station controller 4.

There is further shown a client device 5, wherein the set of base stations 3 participate in a coordinated multipoint (CoMP) technique for serving the client device 5.

When considering a CoMP technique, it is necessary to consider the backhaul network properties, such as available capacity and latency for the clustering procedure, because the CoMP technique needs to share information and/or user data with other base stations through the backhaul network.

For this purpose, it is known to determine whether the backhaul network supports a coordinated multipoint technique selected for a cooperating base station, and in case the backhaul network is not sufficient to support a coordinated multipoint technique for one or more of the cooperating base stations, reconfiguring the backhaul network to meet the requirements of the coordinated multipoint technique.

However, a poor and, therefore, insufficient performance might be caused by the backhaul network itself. In this case, reconfiguring the wireless communication network might be useless or even have the adverse effect on LTE-Advanced performance.

FIG. 2 illustrates a system 10 for facilitating coordinated multipoint communication for a client device 11 in a wireless communication network 12 according to embodiments of the present invention.

According to the shown embodiment, the wireless communication 12 network comprises three base stations 13 and a backhaul network 14 connecting the plurality of base stations 13. The backhaul network 14 is again schematically shown by lines connecting the three base stations 13 with each other. There is further shown a client device 11, wherein the plurality of base stations 13 participate in a CoMP technique for serving the client device 11.

The shown system 10 further comprises a means 15 for creating an actual coverage map for the coordinated multipoint communication by analyzing data transfer between the client device 11 and the three base stations 13, a means 16 for analyzing the created actual coverage map to determine whether the backhaul network 14 is sufficient for a selected CoMP technique and a network controller 17 to reconfigure the backhaul network 14 if the backhaul network 14 is not sufficient for a selected CoMP technique.

Thus, a toolkit is provided by means of the means 15 for creating an actual coverage map for the coordinated multipoint communication by analyzing data transfer between the client device 11 and the three base stations 13, a means 16 for analyzing the created actual coverage map to determine whether the backhaul network 14 is sufficient for a selected CoMP technique. The toolkit is established to create an actual coverage map for the coordinated multipoint communication, which can include reliability information of the communication based on throughput reports of the client device, in order to indicate communication characteristics of the CoMP communication. Further, the toolkit is established to determine, whether the characteristics of the CoMP communication are sufficient for a selected CoMP technique.

There are further shown three network interface devices 18. As can be seen in FIG. 2, each of the network interface devices 18 therein is assigned to one base station 13 and arranged in close proximity of the respective base station 13. Here, each of the network interface devices 18 being arranged in close proximity of the respective base station 13 denotes that the network interface device 18 is arranged in the proximity of the base station 13 in such a way, that it can cover data throughput through the respective base station 13, for example using pass through mode technique.

According to the embodiments of FIG. 2, each of the network interface device 18 comprises means 19 for determining one or more key performance indicators of the backhaul network if the means 16 for analyzing the created actual coverage map determines that the backhaul network 14 is not sufficient for a selected coordinated multipoint technique. There is further shown a means 20 for creating a conditional coverage map on the basis of the determined one or more key performance indicators, and a means 21 for comparing the actual coverage map with the conditional coverage map.

Thus, a second toolkit is provided, which is established to create a conditional coverage map, which can include reliability information of the backhaul network 14 based on throughputs through the base stations 13 and to compare the conditional coverage map with the actual coverage map to determine whether the conditional coverage map matches the actual coverage map.

The network controller 17 reconfigures the wireless communication network 14 if the actual coverage map does not match the conditional coverage map and, therefore, if it is determined that insufficient performance of the CoMP communication is not caused by the backhaul network 14 itself, in order to avoid false corrective actions.

The shown means 19 for determining one or more key performance indicators of the backhaul network 14 comprises means 22 for measuring data transfer delay on the backhaul network 14 and a means 23 for estimating phase accuracy of data transfer on the backhaul network 14. However, that the one or more key performance indicators comprise data transfer delay and phase accuracy estimation should merely be understood as an example, and there can be means for determining further key performance indicators giving feedback on the backhaul network performance, too.

There are further shown means 24 for comparing each of the two determined key performance indicators, data transfer delay and phase accuracy estimation, to corresponding threshold values. Further, the means 20 for creating a conditional coverage map on the basis of the determined one or more key performance indicators creates the conditional coverage map if at least one of the two key performance indicators exceeds a corresponding threshold value.

According to the embodiments of FIG. 2, the selected coordinated multipoint technique comprises coordinated scheduling. However, that the selected CoMP technique is coordinated scheduling should merely be understood as an example, and the selected CoMP technique can comprise joint processing and coordinated beamforming or coordinated scheduling together with coordinated beamforming, too.

The network controller 17 can reconfigure or activate network components according to the performance requirements of the selected coordinated multipoint technique for reconfiguring the wireless communication network. For example, the network components activated by the network controller 17 can include an optical tunneling link between serving base stations and one or more cooperating base stations. Thereby, an excessive multi-hop delay resulting in an increased latency which is not suitable for supporting the selected CoMP technique can be encountered. The optical tunneling link may also be provided in case it turns out that a network latency for transmitting data for the selected CoMP technique is not sufficient. An example of a further network component that may be activated by the network controller is a wireless point-to-point backhaul link, for example a microwave link between serving base stations and cooperating base stations.

FIG. 3 illustrates a flowchart of a method 30 for facilitating coordinated multipoint communication for a client device in a wireless communication network according to embodiments of the present invention.

In particular, FIG. 3 illustrates a flow chart of a method 30 for facilitating coordinated multipoint communication for a client device in a wireless communication network comprising a plurality of base stations and a backhaul network connecting the plurality of base stations. The method comprises the following steps: In a first step 31, a plurality of network interface devices for measuring synchronization accuracy in the backhaul network are provided, wherein each of the plurality of network devices is assigned to one of the plurality of base stations and arranged in close proximity to the respective base station. Further, in a step 32, an actual coverage map for the coordinated multipoint communication is created by analyzing data transfer between the client device and the plurality of base stations. The created actual coverage map is in step 33 analyzed to determine, whether the backhaul network is sufficient for a selected coordinated multipoint technique. If the backhaul network is not sufficient for the selected coordinated multipoint technique, one or more key performance indicators indicating the performance of the backhaul network are determined in step 34 by means of the plurality of network interface devices, a conditional coverage map is created on the basis of the determined one or more key performance indicators in step 35 and the actual coverage map is compared with the conditional coverage map to determine whether the actual coverage map matches the conditional coverage map in step 36. Further, in step 37, the wireless communication network is reconfigured if the actual coverage map does not match the conditional coverage map, in particular by using respective SON techniques.

If it is determined in step 33, that the backhaul network is sufficient for a selected coordinated multipoint technique, the steps 31, 32 and 33 are repeated. If it is determined in step 33, that the backhaul network is not sufficient for a selected CoMP technique, the method continues with step 34.

Further, as can be seen in FIG. 3, if it is determined in step 36 that the actual coverage map matches the conditional coverage, steps 31 to 35 are repeated. If it is determined in step 36, that the actual coverage map does not match the conditional coverage, the method continues with step 37. Thereby, it can be ensured that the wireless communication network is reconfigured only if it is determined that insufficient performance of the CoMP communication is not caused by the backhaul network 14 itself and, therefore, false corrective actions can be avoided.

FIG. 4 illustrates a flowchart of a method 30 as in FIG. 3, further comprising the step 41 of comparing each of the determined one or more key performance indicators to corresponding threshold values for the one or more key performance indicators. The conditional coverage map may be created if at least one of the one or more key performance indicators exceeds a corresponding threshold value.

LIST OF REFERENCE SIGNS 1 wireless communication network
2 base station
3 set of base stations
4 base station controller
5 client device
10 system
11 client device
12 wireless communication network
13 base station
14 backhaul network
15 means
16 means
17 network controller
18 network interface device
19 means
20 means
21 means
22 means
23 means
24 means
30 method
31 step
32 step
33 step
34 step
35 step
36 step
37 step
41 step

The invention claimed is:

1. A method for facilitating coordinated multipoint communication for a client device in a wireless communication network comprising a plurality of base stations and a backhaul network connecting the plurality of base stations, the method comprising the steps of:
    providing a plurality of network interface devices for measuring synchronization accuracy in the backhaul network, wherein each of the plurality of network interface devices is assigned to one of the plurality of base stations and arranged in close proximity to the respective base station;
    creating an actual coverage map for the coordinated multipoint communication by analyzing data transfer between the client device and the plurality of base stations;
    analyzing the created actual coverage map to determine whether the backhaul network is sufficient for a selected coordinated multipoint technique;
    if the backhaul network is not sufficient for the selected coordinated multipoint technique, determining one or more key performance indicators indicating the performance of the backhaul network by means of the plurality of network interface devices;
    creating a conditional coverage map on the basis of the determined one or more key performance indicators;
    comparing the actual coverage map with the conditional coverage map to determine whether the actual coverage map matches the conditional coverage map;
    reconfiguring the wireless communication network if the actual coverage map does not match the conditional coverage map.

2. The method according to claim 1, wherein the step of determining one or more key performance indicators of the backhaul network by means of the plurality of network interface devices comprises measuring data transfer delay on the backhaul network and/or estimating phase accuracy of data transfer on the backhaul network.

3. The method according to claim 1, wherein the method further comprises the steps of:
    comparing each of the determined one or more key performance indicators to corresponding threshold values for the one or more key performance indicators;
    creating the conditional coverage map if at least one of the one or more key performance indicators exceeds a corresponding threshold value.

4. The method according to claim 1, wherein the selected coordinated multipoint technique comprises joint processing, coordinated scheduling and/or coordinated beamforming.

5. The method according to claim 1, wherein the step of reconfiguring the wireless communication network if the actual coverage map does not match the conditional coverage map comprises reconfiguring or activating network components according to requirements of the selected coordinated multipoint technique.

6. A system for facilitating coordinated multipoint communication for a client device in a wireless communication network, the wireless communication network comprising a plurality of base stations and a backhaul network connecting the plurality of base stations, wherein the system creates an actual coverage map for the coordinated multipoint communication by analyzing data transfer between the client device and the plurality of base stations, and analyzes the created actual coverage map to determine whether the backhaul network is sufficient for a selected coordinated multipoint technique and a network controller to reconfigure the wireless communication network if the backhaul network is not sufficient for the selected coordinated multipoint technique, wherein the system further comprises a plurality of network interface devices for measuring synchronization accuracy in the backhaul network, wherein each of the plurality of network interface devices is assigned to one of the plurality of base stations and arranged in close proximity to the respective base station, wherein each of the network interface devices determines one or more key performance indicators of the backhaul network if the system determines that the backhaul network is not sufficient for a selected coordinated multipoint technique, wherein the system further creates a conditional coverage map on the basis of the determined one or more key performance indicators, and compares the actual coverage map with the conditional coverage map and wherein the network controller reconfigures the wireless communication network if the actual coverage map does not match the conditional coverage map.

7. The system according to claim 6, wherein the system determines the one or more key performance indicators of the backhaul network by measuring data transfer delay on the backhaul network and/or estimating phase accuracy of data transfer on the backhaul network.

8. The system according to claim 6, wherein the system further compares each of the one or more determined key performance indicators to corresponding threshold values and creates the conditional coverage map if at least one of the one or more key performance indicators exceeds a corresponding threshold value.

9. The system according to claim 6, wherein the selected coordinated multipoint technique comprises joint processing, coordinated scheduling and/or coordinated beamforming.

10. The system according to claim 6, wherein the network controller reconfigures or activates network components according to the requirements of the selected coordinated multipoint technique for reconfiguring the wireless communication network.

11. The method according to claim 2, wherein the method further comprises the steps of:
comparing each of the determined one or more key performance indicators to corresponding threshold values for the one or more key performance indicators;
creating the conditional coverage map if at least one of the one or more key performance indicators exceeds a corresponding threshold value.

12. The method according to claim 2, wherein the selected coordinated multipoint technique comprises joint processing, coordinated scheduling and/or coordinated beamforming.

13. The method according to claim 3, wherein the selected coordinated multipoint technique comprises joint processing, coordinated scheduling and/or coordinated beamforming.

14. The method according to claim 2, wherein the step of reconfiguring the wireless communication network if the actual coverage map does not match the conditional coverage map comprises reconfiguring or activating network components according to requirements of the selected coordinated multipoint technique.

15. The method according to claim 3, wherein the step of reconfiguring the wireless communication network if the actual coverage map does not match the conditional coverage map comprises reconfiguring or activating network components according to requirements of the selected coordinated multipoint technique.

16. The system according to claim 7, wherein the system further compares each of the one or more determined key performance indicators to corresponding threshold values and creates the conditional coverage map if at least one of the one or more key performance indicators exceeds a corresponding threshold value.

17. The system according to claim 7, wherein the selected coordinated multipoint technique comprises joint processing, coordinated scheduling and/or coordinated beamforming.

18. The system according to claim 8, wherein the selected coordinated multipoint technique comprises joint processing, coordinated scheduling and/or coordinated beamforming.

19. The system according to claim 7, wherein the network controller reconfigures or activates network components according to the requirements of the selected coordinated multipoint technique for reconfiguring the wireless communication network.

20. The system according to claim 8, wherein the network controller reconfigures or activates network components according to the requirements of the selected coordinated multipoint technique for reconfiguring the wireless communication network.

* * * * *